United States Patent
Rike et al.

[11] Patent Number: 5,845,747
[45] Date of Patent: Dec. 8, 1998

[54] PISTON WITH EXTENDED OUTER COVER FOR USE IN DISC BRAKE ASSEMBLY

[75] Inventors: Russell E. Rike, Spring Valley; Brent A. Armentrout, Tipp City, both of Ohio

[73] Assignee: Dayton Walther Corporation, Dayton, Ohio

[21] Appl. No.: 834,586

[22] Filed: Apr. 7, 1997

Related U.S. Application Data

[63] Continuation of Ser. No. 510,806, Nov. 13, 1995, abandoned.

[51] Int. Cl.⁶ .............................. F16D 55/18; F16D 65/78
[52] U.S. Cl. ...................................... 188/72.4; 188/264 G
[58] Field of Search .................. 188/264 G, 72.4, 188/264 R; 92/172, 192, 176, 208, 246

[56] References Cited

U.S. PATENT DOCUMENTS

| | | | |
|---|---|---|---|
| 2,801,714 | 8/1957 | Dotto | 188/264 |
| 4,170,926 | 10/1979 | Emmett | 92/212 |
| 4,306,489 | 12/1981 | Driver et al. | 92/212 |
| 4,401,012 | 8/1983 | Emmett | 92/248 |
| 4,449,447 | 5/1984 | Yanagi | 92/248 |
| 4,513,844 | 4/1985 | Hoffman, Jr. | 188/71.6 |
| 4,581,985 | 4/1986 | Villata | 92/248 |
| 4,649,806 | 3/1987 | Hartsock | 92/212 |
| 4,928,579 | 5/1990 | Emmett | 92/248 |
| 5,484,041 | 1/1996 | Cadaret et al. | 188/73.37 |

FOREIGN PATENT DOCUMENTS

| | | |
|---|---|---|
| 1228963 | 11/1987 | Canada . |
| 2134-940 | 9/1978 | Germany . |
| 4328836-A1 | 3/1995 | Germany . |
| 57-18857 | 1/1982 | Japan . |
| 2028 | 1/1987 | Japan ................................. 188/264 G |
| 1114446 | 5/1968 | United Kingdom . |
| 2122277 | 1/1984 | United Kingdom ............... 188/264 G |
| 2 165 902 A | 4/1986 | United Kingdom . |

OTHER PUBLICATIONS

Drawing No. DM–52–HW–4149, dated Dec. 13, 1989.
Drawing No. "Insert DM–52", dated Dec. 13, 1989.

*Primary Examiner*—Peter M. Poon
*Attorney, Agent, or Firm*—MacMillan, Sobanski & Todd

[57] ABSTRACT

A piston for use in a vehicle disc brake assembly includes a generally hollow cylindrical body having an open end and a closed end. The body is formed from a plastic material and includes inner and outer cylindrical surfaces which extend axially between the open end and the closed end. A generally cylindrical steel cover is integrally molded about the closed end and the outer surface of the body of the piston. The cover includes an end wall, an outer side wall and an open end. The end wall of the cover extends about the closed end of the body of the piston, and the outer side wall of the cover extends axially along the outer surface of the body of the piston. The outer side wall of the cover extends past the open end of the body of the piston, in the direction of the brake shoe. Accordingly, during the braking operation it is the steel cover which urges the brake shoe against the rotor, instead of the body of the piston urging the brake shoe against the rotor. The body of the piston does not come into contact with the brake shoe. This structure effectively protects the plastic body of the piston from the heat generated during braking, and thereby greatly extends the life of the piston.

20 Claims, 6 Drawing Sheets

PISTON WITH EXTENDED OUTER COVER FOR USE IN DISC BRAKE ASSEMBLY

CROSS REFERENCES TO RELATED APPLICATIONS

This application is a continuation of U.S. patent Ser. No. 08/510,806, filed Nov. 13, 1995, now abandoned.

BACKGROUND OF THE INVENTION

This invention relates in general to vehicle disc brake assemblies and in particular to an improved structure for a piston adapted for use in such a vehicle disc brake assembly.

Most vehicles are equipped with a brake system for retarding or stopping movement of the vehicle in a controlled manner. A typical brake system for an automobile and light duty truck includes a disc brake assembly for the front wheels of the vehicle, and either a disc brake assembly or a drum brake assembly for the rear wheels of the vehicle. A typical brake system for a medium duty truck includes a disc brake assembly on all four wheels of the vehicle. The brake assemblies are typically actuated by hydraulic or pneumatic pressure generated when an operator of the vehicle depresses a brake pedal. The structures of the disc brake assembly, as well as the actuators therefor, are well known in the art.

There are two basic types of calipers for use in disc brake assemblies, namely, a "floating" caliper disc brake assembly, and a "fixed" caliper disc brake assembly. A floating caliper type of disc brake assembly is usually used on automobiles and light and medium duty trucks. A conventional floating caliper type of disc brake assembly includes a brake caliper which is supported by a pair of pins for sliding movement relative to an anchor plate which is secured to a fixed, non-rotatable component of the vehicle. A fixed caliper type of disc brake assembly is sometimes used on automobiles and light and medium duty trucks. A conventional fixed caliper type of disc brake assembly includes a brake caliper which is solidly fixed to a fixed, non-rotatable component of the vehicle.

In both types of disc brake assemblies, a pair of brake shoes are supported by the disc brake assembly for sliding movement relative thereto. The brake shoes have respective friction pads which are disposed on opposite sides of a rotor. The rotor, in turn, is connected to the wheel of the vehicle for rotation therewith. To effect braking action, the brake shoes are moved inwardly toward one another so as to frictionally engage the opposed sides of the rotor. Such frictional engagement causes retarding or stopping of the rotational movement of the rotor and, therefore, the wheel of the vehicle in a controlled manner.

To accomplish this in a fixed caliper type of disc brake assembly, the brake caliper assembly includes an inboard caliper assembly disposed adjacent an inboard brake shoe, and an outboard caliper assembly disposed adjacent an outboard brake shoe. One or more hydraulically or pneumatically actuated pistons are provided in respective cylindrical recesses formed in the inboard caliper assembly adjacent the inboard brake shoe, and one or more hydraulically or pneumatically actuated pistons are provided in respective cylindrical recesses formed in the outboard caliper assembly adjacent the outboard brake shoe. This type of construction is commonly referred to as an "opposed" piston caliper design. When the brake pedal is depressed, the pistons urge the brake shoes toward one another and into engagement with the associated side of the rotor. As result, the brake shoes frictionally engage the opposed sides of the rotor.

During frictional engagement of the brake shoes with the rotor, a considerable amount of heat is generated. In a disc brake assembly having a piston constructed from a metallic material, the heat generated during braking will not usually damage the surface of the open end of the piston. Unfortunately, a disc brake piston which is formed from a metallic material is relatively expensive. It is less expensive to manufacture a disc brake piston from a plastic material than from a metallic material. U.S. Pat. No. 4,928,579 to Emmett, U.S. Pat. No. 4,449,447 to Yanagi, U.S. Pat. No. 4,401,012 to Emmett, and Japanese Patent No. 5718857 disclose prior art disc brake pistons. However, it has been found that the heat generated during braking can damage the surface of a piston formed from a plastic material. Thus, it would be desirable to provide an improved structure for a piston which is durable yet relatively inexpensive to manufacture.

SUMMARY OF THE INVENTION

This invention relates to an improved structure for a piston adapted for use in a vehicle disc brake assembly. The piston includes a generally hollow cylindrical body having an open end and a closed end. The body is formed from a plastic material and includes inner and outer cylindrical surfaces which extend axially between the open end and the closed end. A generally cylindrical steel cover is integrally molded about the closed end and the outer surface of the body of the piston. The cover includes an end wall, an outer side wall and an open end. The end wall of the cover extends about the closed end of the body, and the outer side wall of the cover extends axially along the outer cylindrical surface of the body. The outer side wall of the cover extends past the open end of the body of the piston, in the direction of the brake shoe. (In other words, the open end of the body of the piston is recessed in relation to the outer side wall of the steel cover.) Accordingly, during the braking operation it is the steel cover which urges the brake shoe against the rotor, instead of the body of the piston urging the brake shoe against the rotor. The body of the piston does not come into contact with the brake shoe. This structure effectively protects the plastic body of the piston from the heat generated during braking, and thereby greatly extends the life of the piston. Preferably the piston also includes means for supporting the outer side wall of the cover near its open end, so that the outer side wall does not collapse from the force of abutment against the brake shoe. In a preferred means, the body of the piston and the outer side wall of the cover are reduced in diameter about their open ends, forming a shoulder, so that the body of the piston provides support.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
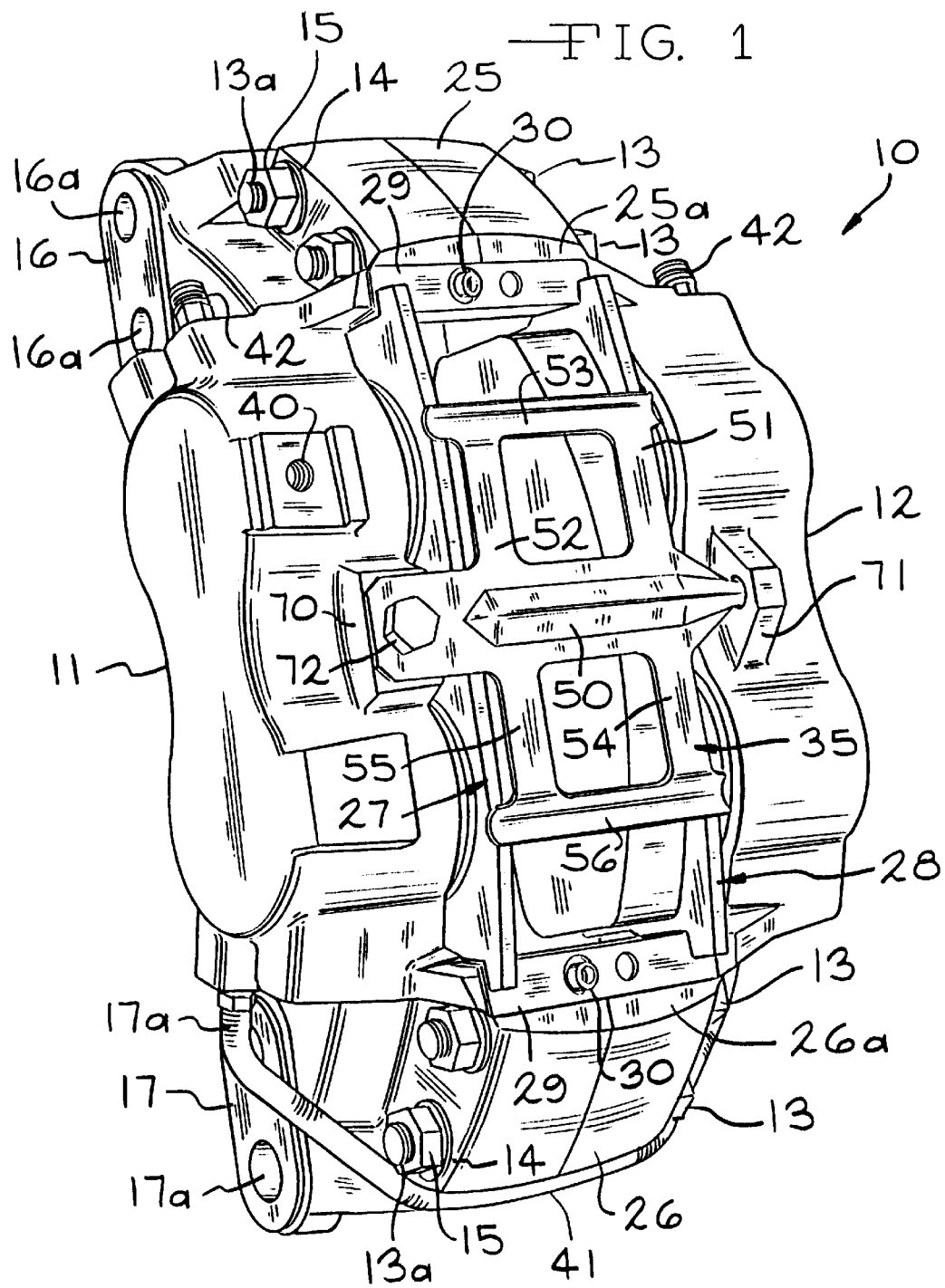
FIG. 1 is a perspective view of a portion of a vehicle disc brake assembly adapted to include an improved disc brake piston in accordance with this invention.
Figure 2:
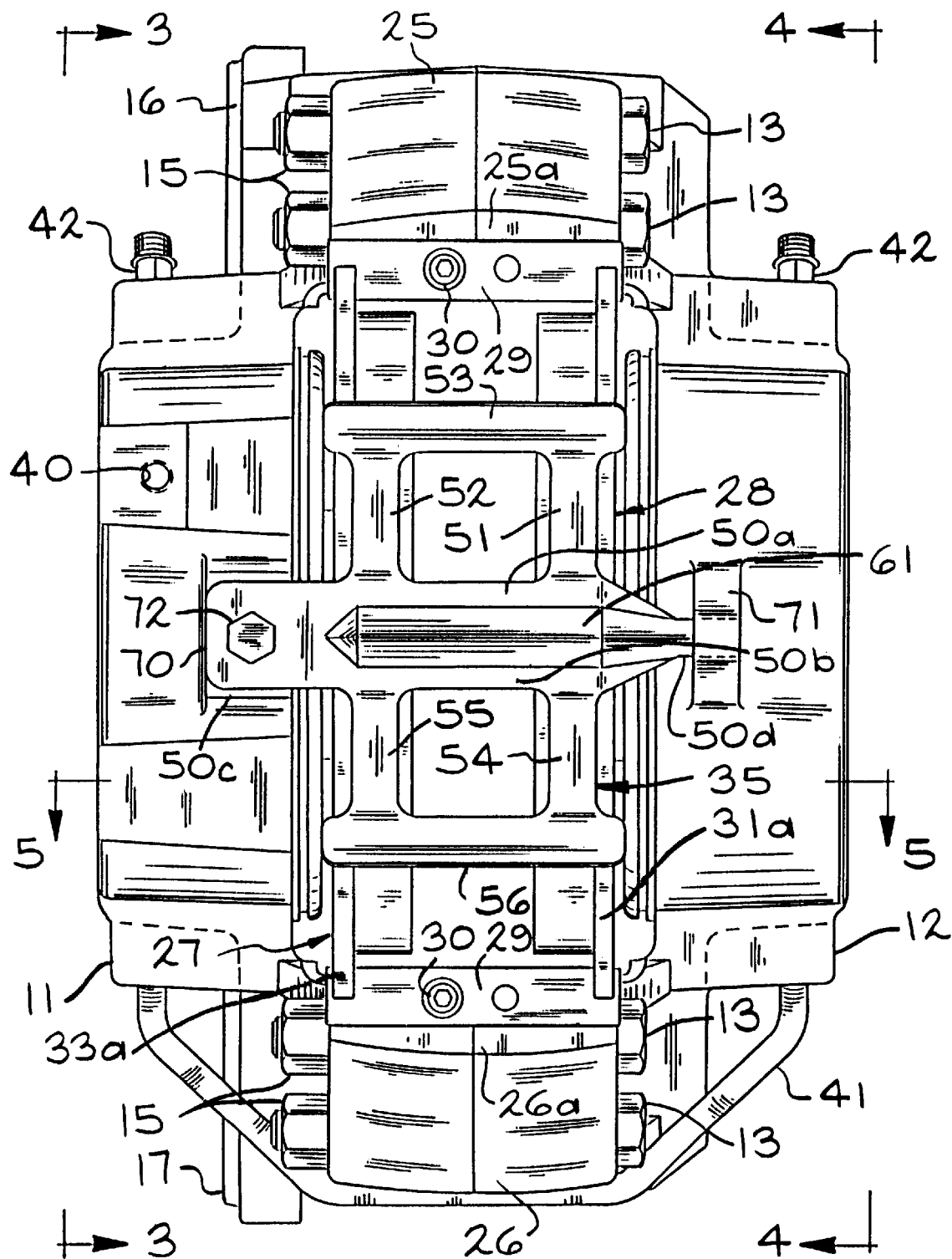
FIG. 2 is a top plan view of the disc brake assembly illustrated in FIG. 1.

Referring now to the drawings, there is illustrated in FIGS. 1 and 2 a vehicle disc brake assembly, indicated generally at 10, and constructed in accordance with the present invention. The general structure and operation of the disc brake assembly 10 is conventional in the art. Thus, only those portions of the disc brake assembly 10 which are necessary for a full understanding of this invention will be explained and illustrated.

Figure 3:
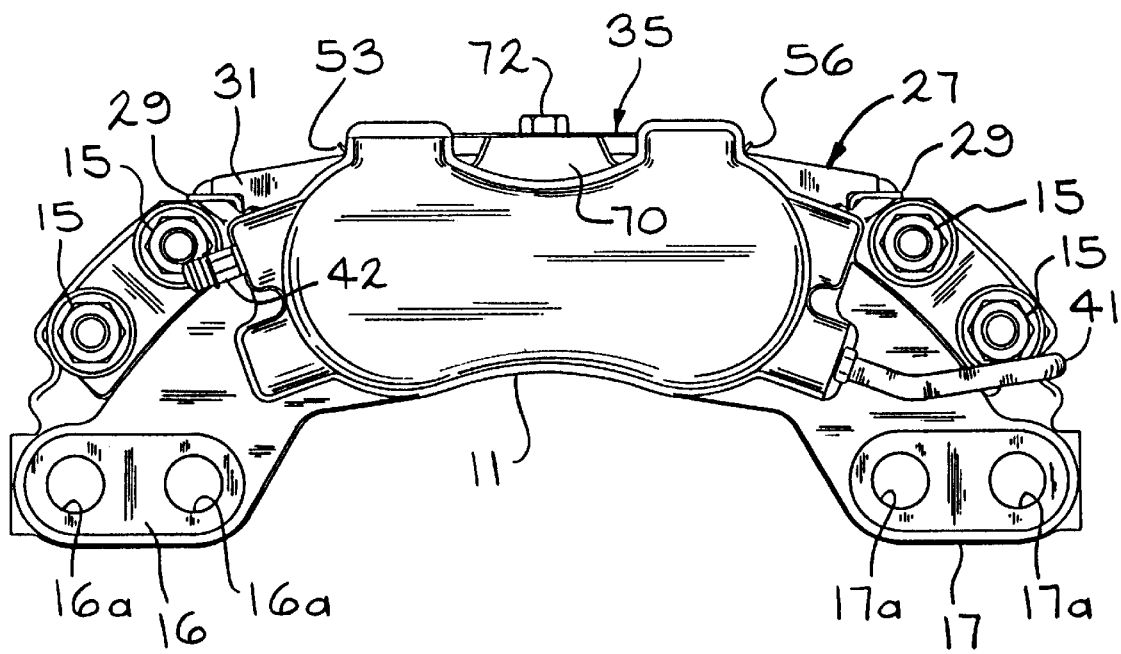
FIG. 3 is an elevational view of the disc brake assembly taken along line 3—3 of FIG. 2.
Figure 4:
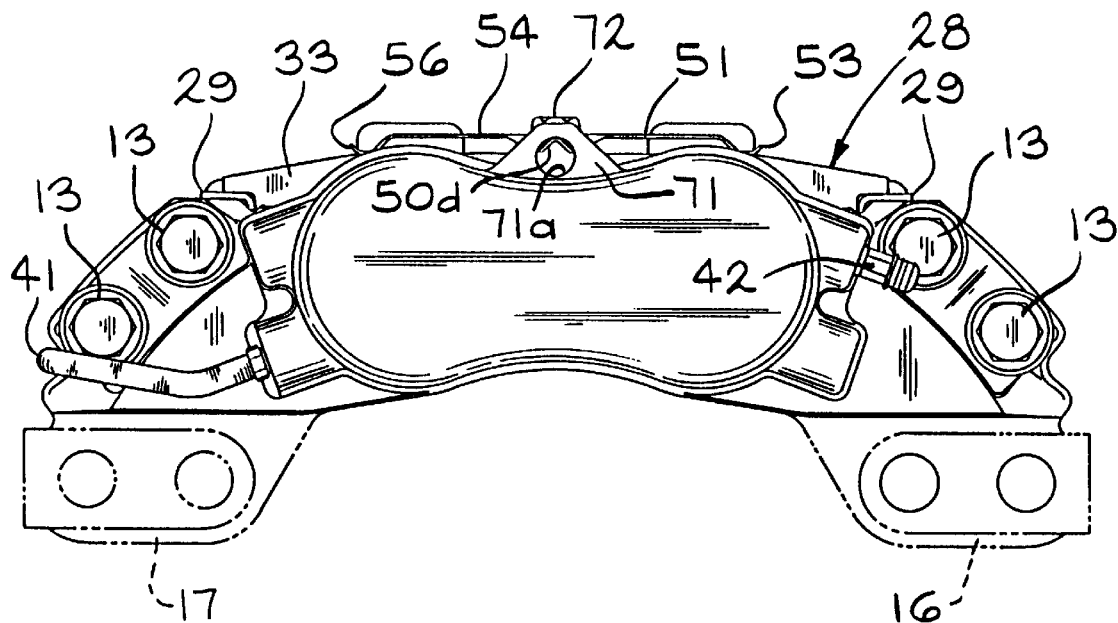
FIG. 4 is an elevational view of the disc brake assembly taken along line 4—4 of FIG. 2.

The illustrated disc brake assembly is an opposed four piston fixed caliper type of disc brake assembly, and is associated with a right wheel of a vehicle. The disc brake assembly 10 is a two-piece construction, and includes an inboard brake caliper assembly 11, best shown in FIG. 3, and an outboard brake caliper assembly 12, best shown in FIG. 4. The construction of the inboard caliper assembly 11 and the outboard caliper assembly 12 are generally similar to one another, and like reference numbers will be used for corresponding parts. Alternatively, the inboard caliper assembly 11 and the outboard caliper assembly 12 may be integrally formed.

The inboard brake caliper assembly 11 and the outboard brake caliper assembly 12 are provided with respective pairs of aligned apertures formed therethrough. Threaded bolts 13 extend through the respective pairs of apertures, and washers 14 and nuts 15 are installed on threaded ends 13a of the bolts 13 to secure the inboard caliper assembly 11 to the outboard caliper assembly 12.

The inboard caliper assembly 11 includes a pair of anchoring arms 16 and 17 provided at opposed ends thereof. Each of the arms 16 and 17 are provided with a pair of apertures 16a and 17a, respectively, formed therethrough, and are adapted to receive bolts (not shown) for securing the inboard caliper assembly 11, and therefore the assembled disc brake assembly 10, to a fixed, non-rotatable component of the vehicle, such as an axle flange (when the disc brake assembly is installed for use on the rear of the vehicle), or a steering knuckle (when the disc brake assembly is installed for use on the front of the vehicle).

Figure 5:
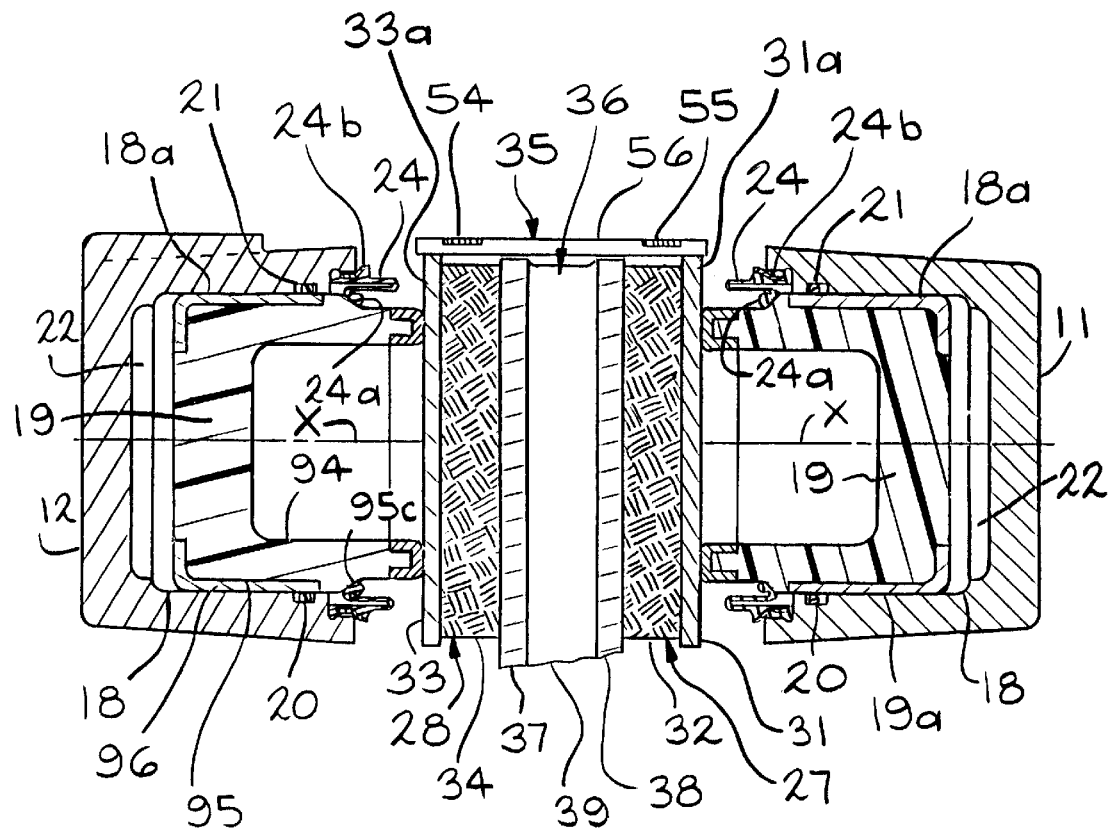
FIG. 5 is a cross-sectional view taken along line 5—5 of FIG. 2 including the improved disc brake piston

The illustrated inboard caliper assembly 11 includes a pair of cylindrical recesses 18 formed therein, only one recess 18 is shown in FIG. 5. Similarly, the outboard caliper assembly 12 includes a pair of cylindrical recesses 18 formed therein, only one recess 18 is shown in FIG. 5. A piston 19 is disposed in each of the cylindrical recesses 18, and a fluid seal 20 is disposed in an annular groove 21 formed in a side wall 18a of the cylindrical recess 18, and engages an outer side wall 95a of the piston 19. The fluid seal 20 is provided to define a sealed hydraulic actuator chamber 22, within which the piston 19 is disposed for sliding movement.

In particular, the inboard caliper assembly 11 includes a pair of hydraulic actuator chambers 22 which are connected together by a fluid passageway (not shown) formed therein. Similarly, the outboard caliper assembly 12 includes a pair of hydraulic actuator chambers 22 which are connected together by a fluid passageway (not shown) formed therein. Also, the fluid seal 20 is designed to function as a roll-back seal which retracts the piston 19 within the cylindrical recess 18 when the disc brake assembly 10 is not actuated. Thus, it will be appreciated that the illustrated brake actuating means is a hydraulic actuating means. However, other well known types of actuating means, such as pneumatic, electrical, and mechanical, can be used.

A dust boot seal 24 is provided about the outboard end of the piston 19 to prevent water, dirt, and other contaminants from entering into the cylindrical recess 18. The dust boot seal 24 is formed from a flexible material and has a first end 24a which engages an outer side wall of a shoulder 95c of the piston 19 and a second end 24b which engages an annular recess formed adjacent the open ends of the associated cylindrical recesses 18. A plurality of flexible convolutions are provided in the dust boot seal 24 between the first and second ends thereof to accommodate movement of the pistons 19 within each of the respective cylindrical recesses 18.

The disc brake assembly 10 includes a pair of arms 25 and 26 having respective guide rails 25a and 26a formed thereon. The guide rails 25a and 26a extend transverse to the arms 25 and 26, and extend parallel to one another. As will be discussed, a pair of brake shoes 27 and 28 are supported on the guide rails 25a and 26a for sliding movement relative thereto. Preferably, a hardened replaceable insert 29 is secured to each of the guide rail 25 and 26 by a fastener 30. The inserts 29 are preferably formed from stainless steel, and provide a smooth, corrosion resistant sliding surface for the brake shoes 27 and 28.

The inboard brake shoe 27 includes a backing plate 31 having a friction pad 32 secured thereto. Similarly, the outboard brake shoe 28 includes a backing plate 33 having a friction pad 34 secured thereto.

In the illustrated embodiment, a brake shoe hold down clip 35 is releasably attached to the disc brake assembly 10 to bias opposed upper ends 31a and 33a of the backing plates 31 and 33, respectively, of brake shoes 27 and 28 against the guide rails 25a and 26a. The hold down clip 35 is generally arcuate shaped, and is formed having a longitudinally extending central mounting portion 50. A first pair of opposed spaced apart arms 51 and 52 extend transverse to and outwardly from one side 50a of the central mounting portion 50. The ends of the first pair of arms 51 and 52 terminate at and are interconnected by a generally U-shaped first end arm 53 which extends generally parallel to the central mounting portion 50.

The hold down clip 35 further includes a second pair of spaced apart arms 54 and 55 extend transverse to and outwardly from the opposite side 50b of the central mounting portion 50. The ends of the second pair of arms 54 and 55 terminate at and are interconnected by a generally U-shaped second end arm 56 which extends generally parallel to the central mounting portion 50.

The central mounting portion 50 further includes an aperture (not shown) formed adjacent one end 50c thereof, and a raised, generally inverted V-shaped strengthening rib 61 which extends substantially the entire length thereof and terminates at an opposite end 50d. The end 50d of the hold down clip is disposed in an opening formed in a raised mounting pad 71 provided on the outboard caliper assembly 12. A bolt 72 having a threaded end extends through the aperture in the hold down clip 35 and is threadably received in a threaded aperture formed in a raised mounting pad 70 provided on the inboard caliper assembly 11.

As shown in FIG. 5, the brake shoes 27 and 28 are disposed on opposite sides of a rotor 36. The rotor 36 is generally flat and circular in shape and is secured in a conventional manner to a rotatable wheel (not shown) of the vehicle. The illustrated rotor 36 includes a pair of opposed braking discs 37 and 38 which are spaced apart from one another by a plurality of intermediate vanes 39 in a known manner.

When it is desired to actuate the disc brake assembly 10 to retard or stop the rotation of the brake rotor 36 and the vehicle wheel associated therewith, the driver of the vehicle depresses the brake pedal (not shown). In a manner which is well known in the art, the depression of the brake pedal causes pressurized hydraulic fluid to be introduced into the disc brake assembly via a threaded inlet port 40 provided in the inboard caliper assembly 11. The inlet port 40 is connected through a brake line (not shown) to a master cylinder (not shown) of the vehicle brake system. The brake line is attached to the inlet port 40 by a threaded fitting (not shown). The fluid flows from the inlet port 40 into the inboard fluid chambers 22 to urge the associated pistons 19 in the inboard caliper assembly 11 in the outboard direction (toward the left when viewing FIG. 5) into engagement with the backing plate 31 of the inboard brake shoe 27.

The fluid chambers 22 of the inboard caliper assembly 11 are connected to the fluid chambers 22 of the outboard caliper assembly 12 by a fluid supply assembly 41. Thus, at the same time, the fluid flows through the fluid supply assembly 41 into the outboard fluid chambers 21 to urge the associated pistons 19 in the outboard caliper assembly 12 in the inboard direction (toward the right when viewing FIG. 5) into engagement with the backing plate 33 of the outboard brake shoe 28. As a result, the friction pad 32 of the inboard brake shoe 27 is moved into frictional engagement with the inboard braking disc 37 of the rotor 36, and the friction pad 34 of the outboard brake shoe 28 is simultaneously moved into frictional engagement with the outboard braking disc 38 of the brake rotor 36. As a result, the rotor 36 is frictionally engaged by the friction pads 32 and 34 to retard relative rotational movement thereof.

The disc brake assembly 10 further includes a pair of bleeder screws 42 which are received in a threaded aperture provided in each of the inboard caliper assembly 11 and the outboard caliper assembly 12. The bleeder screws 42 are provided to bleed air from the associated fluid chambers 21 when the disc brake assembly 10 is initially connected to the vehicle hydraulic brake system.

Figure 6:
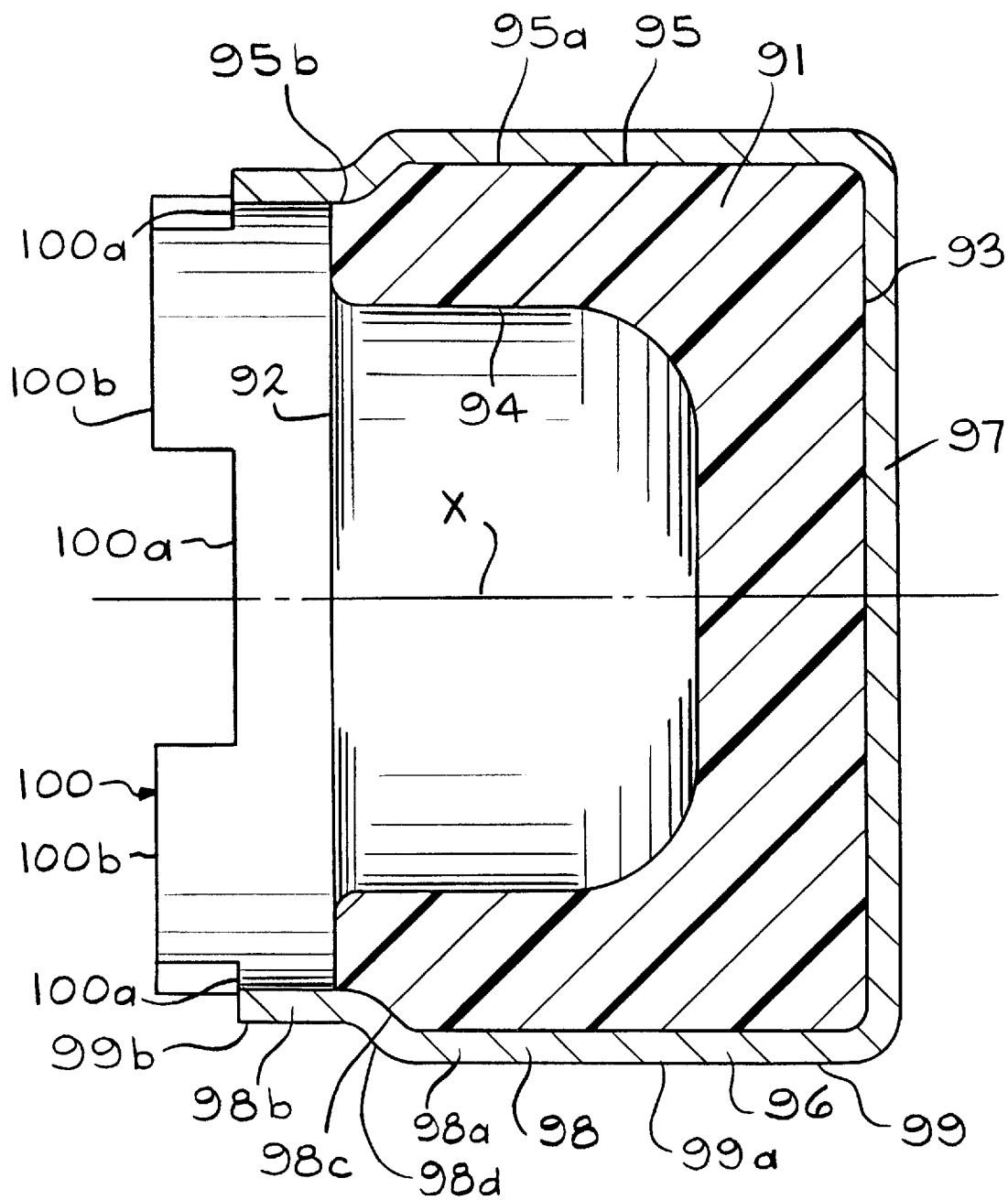
FIG. 6 is a cross-sectional view of the disc brake piston of FIG. 5.

Referring now to FIGS. 5 and 6, the structure of a piston 19 in accordance with this invention is illustrated in detail. As shown therein, the piston includes a body 91 which is preferably molded from a plastic, and more preferably from a synthetic resin material such as phenolic resin. The body 91 of the piston 19 is generally hollow and cylindrical in shape, having an open end 92 and a closed end 93. An inner cylindrical surface 94 and an outer cylindrical surface 95 extend axially between the open end 92 and the closed end 93. The inner cylindrical surface 94 and the outer cylindrical surface 95 of the body 91 are preferably concentric with a longitudinal axis X of the piston 19.

A generally cylindrical cover 96 is integrally molded about the closed end 93 and the outer cylindrical surface 95 of the body 91 of the piston 19. The cover 96 includes an end wall 97, an outer side wall 98 having an outer diameter 99, and an open end 100. The end wall 97 of the cover 96 extends about the closed end 93 of the body of the piston. The outer side wall 98 of the cover 96 extends axially along the outer cylindrical surface 95 of the body of the piston. In the illustrated embodiment, the open end 100 of the cover 96 is castellated and defines four equidistantly spaced recessed sections 100a (three of which are shown) and four equidistantly spaced projections 100b (two of which are shown). The castellations allow air to circulate inside the piston and provide help in cooling. The cover is preferably formed from a metallic material, for example from steel or aluminum. More preferably the cover is formed from steel which is stainless steel or carbon steel, and can be electroplated with zinc for corrosion protection. However, the cover can also be formed from other materials which are different from the material of the piston.

The outer side wall 98 of the cover 96 extends past the open end 92 of the body of the piston, in the direction of the brake shoe. (In other words, the open end 92 of the body of the piston is recessed in relation to the outer side wall 98 of the cover 96.) As a result, during the braking operation it is the cover which urges the brake shoe against the rotor, instead of the body of the piston urging the brake shoe against the rotor. The body of the piston does not come into contact with the brake shoe. This structure effectively protects the body of the piston from the heat generated during braking and thereby greatly extends the life of the piston. In more detail, the open end 100 of the cover defines an annular abutment surface which is oriented perpendicular to the longitudinal axis X of the piston. The cover's abutment surface is adapted to engage the backing plate of the brake shoe, so that during braking the cover's abutment surface urges the brake shoe against the rotor.

Preferably the piston 19 also includes means for supporting the outer side wall 98 of the cover 96 near its open end 100, so that the outer side wall does not collapse or crumple from the force of abutment against the brake shoe. This is generally important when the side wall of the cover extends more than a very small distance past the open end of the body of the piston. FIG. 6 shows a preferred means for providing this support: the body of the piston and the cover are reduced in diameter ("necked down") about their open ends. Specifically, the outer cylindrical surface 95 of the body of the piston includes a first outer surface 95a and a reduced diameter second outer surface 95b. Similarly, the outer side wall 98 of the cover 96 includes a first outer side wall 98a and a reduced diameter second outer side wall 98b, having outer diameters 99a and 99b respectively. The first and second outer surfaces 95a and 95b extend parallel to and concentric with a longitudinal axis X of the piston 19. Similarly, the first and second outer side walls 98a and 98b are concentric with the longitudinal axis X. The transition between the first and second outer side walls 98a and 98b defines an inner shoulder 98c, and an outer shoulder 98d, which receives the end 24a of the dust boot seal 24. Preferably, as shown in FIG. 6, the outer diameter 99b of the second outer side wall 98b of the cover 96 (i.e., the outer side wall of the cover at the open end) is not greater than the diameter of the first outer surface 95a of the body of the piston (i.e., the outer surface of the body of the piston at the closed end). However, the outer diameter of the outer side wall of the cover at the open end can also be greater than the diameter of the outer surface of the body of the piston at the closed end. It is seen in FIG. 6 that the body of the piston behind the shoulder provides support to the outer side wall of the cover. Advantageously, this preferred structure also retains the body of the piston inside the cover.

Figure 7:
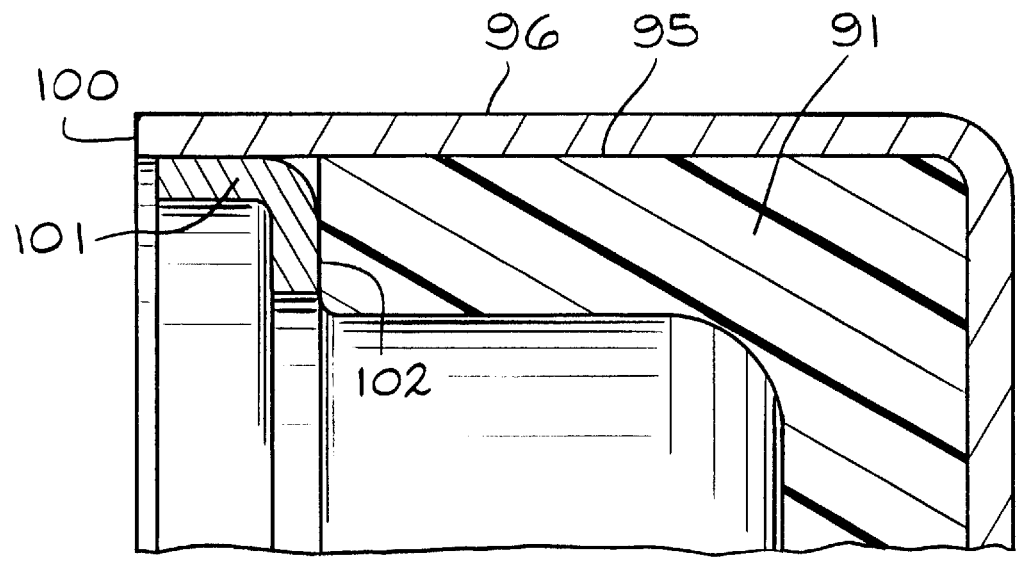
FIG. 7 is a cross-sectional view of a second embodiment of the disc brake piston.

A variety of other means can be used for supporting the outer side wall 98 of the cover 96 near its open end 100. An example is shown in FIG. 7, where the outer surface 95 of the body 91 of the piston 19 and the outer side wall 98 of the cover 96 are straight, but where the piston also includes a generally annular L-shaped piece 101 welded inside the open end 100 of the cover 96, one leg of the L being welded to the cover and the other leg of the L forming a flange 102 which extends radially inwardly. Again, this structure both supports the outer side wall of the cover and retains the body of the piston inside the cover.

Figure 8:
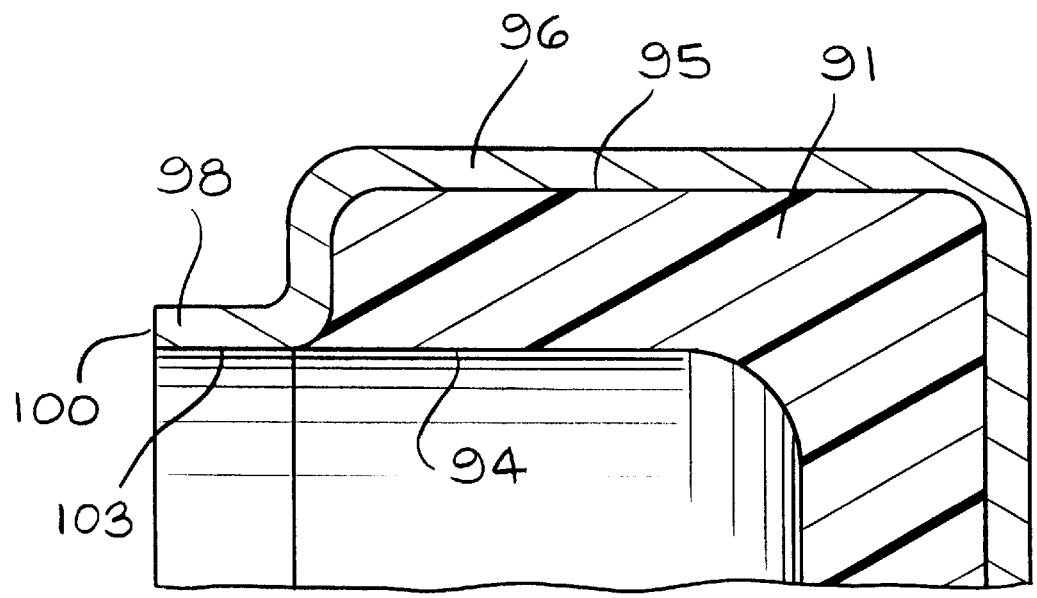
FIG. 8 is a cross-sectional view of a third embodiment of the disc brake piston.
Figure 5:
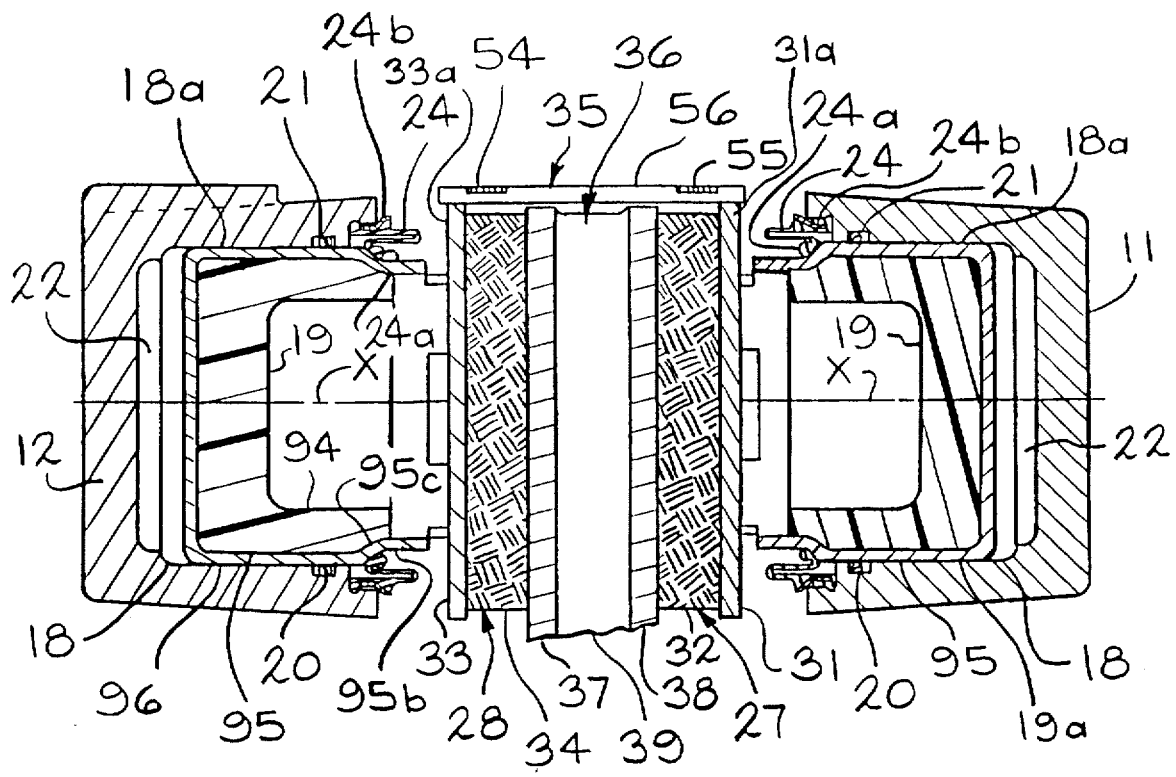

Another example is shown in FIG. 8, where the cover 96 is reduced in diameter about the open end but the outer surface 95 of the body 91 of the piston 19 is straight. In this embodiment, the inner diameter 103 of the outer side wall 98 of the cover 96 at the open end 100 is not greater than the inner diameter 94 of the body 91 of the piston 19.

The thickness of the cover is not critical, but generally a relatively thin cover is preferred. Of course, a thinner cover generally requires more support against the abutment force. The distance the cover extends past the open end of the body of the piston is also not critical, but again a longer distance would generally require more support while a very small distance may not require any support.

Standard molding procedures are sufficient to hold the cover to the body of the piston, but if desired additional treatments or means besides those mentioned above could be used for this purpose. For example, a metal spray could be used to form an adhesive bond between the cover and the body, or the inside of the cover could be coated to produce a rough surface for better adhesion. Projections from the cover into the body could also be used.

It will be appreciated that while the present invention has been described and illustrated in conjunction with the particular vehicle disc brake assembly disclosed herein, the invention may be used in conjunction with other disc brake assemblies. For example, the invention may be used in conjunction with a sliding caliper type of disc brake assembly.

Also, it will be appreciated that other piston structures can be used in conjunction with the present invention. For example, the inner cylindrical surface 94 and the outer cylindrical surface 95 of the piston 19 may extend uninterrupted from the closed end 93 to the open end 92 thereof. In addition, the open end of the cover may have a different configuration than illustrated. For example, the number and spacing of the projections may vary as desired, and the configuration of the projections may be other than illustrated. Alternatively, the open end of the cover may not be castellated.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

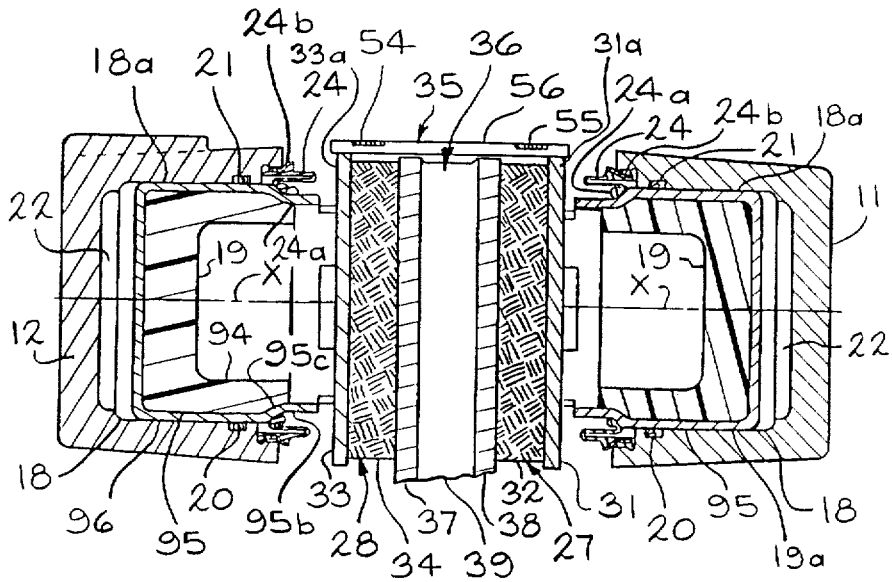

What is claimed is:

1. A disc brake assembly comprising:
   a caliper provided with at least one cylindrical recess formed therein;
   a piston slidably disposed in said recess, said piston including a hollow piston body defining an axis and formed from a phenolic resin, said piston body including an open end defining an outboard end surface, a closed end, an inner surface extending between said open end and said closed end of said piston body, and an outer surface extending between said open end and said closed end of said piston body, said piston body defining a first axial length extending between said closed end and said open end, said piston further including a generally cylindrical unitary metal cover integrally molded in situ with said piston body, said cover including an open end defining an outboard end surface, a closed end defining an inner surface, and a side wall extending between said open end and said closed end of said cover, said cover defining a second axial length extending between said inner surface of said closed end and said outboard end surface of said open end of said cover which is greater than said first axial length defined between said closed end and said open end of said piston body, wherein when said cover is molded in situ with said piston body, said closed end of said piston body is covered by at least a portion of said closed end of said cover, said outer surface of said piston body is covered by at least a portion of said side wall of said cover, at least a portion of said side wall of said cover extending axially past said open end of said piston body thereby locating said outboard end surface of said open end of said piston body radially inwardly relative to said outboard end surface of said open end of said cover,
   a pair of brake shoes carried by said disc brake assembly and adapted to be disposed on opposite sides of a rotor;
   actuation means carried by said caliper for selectively moving said brake shoes between a non-braking position, wherein each of said brake shoes is adapted to be spaced apart from an adjacent side of the rotor, and a braking position, wherein each of said brake shoes is adapted to frictionally engage the adjacent side of the rotor.

2. The piston defined in claim 1 wherein said side wall of said cover includes a first side wall portion adjacent said closed end of said cover and a second side wall portion adjacent said open end of said cover, said first side wall portion extending a first axial length and defining a first cover outer diameter, said second side wall portion extending a second axial length and defining a second cover outer diameter which is less than said first cover outer diameter.

3. The piston defined in claim 2 wherein said first axial length of said first side wall portion of said cover is greater than said second axial length of said second side wall portion of said cover.

4. The piston defined in claim 1 wherein said closed end of said piston body is completely covered by said inner surface of said closed end of said cover.

5. The piston defined in claim 1 wherein said open end of said cover is castellated, having a plurality of equidistantly spaced projections which define a plurality of equidistantly spaced recesses therebetween.

6. The piston defined in claim 1 wherein said piston includes means for supporting said side wall of said cover adjacent said open end thereof.

7. The piston defined in claim 1 wherein said piston includes means for retaining said piston body inside said cover.

8. The piston defined in claim 1 wherein said side wall of said cover extends uninterrupted from said closed end to said open end thereof.

9. The piston defined in claim 1 wherein said cover defines a cover thickness, said piston body defines a piston body thickness which is greater than said cover thickness.

10. The piston defined in claim 1 wherein said outboard end surface of said open end of said piston body is not covered by said outboard end surface of said open end of said cover.

11. A piston adapted for use in a brake assembly comprising:
   a hollow piston body defining an axis and formed from a phenolic resin, said piston body including an open end defining an outboard end surface, a closed end, an inner surface extending between said open end and said closed end of said piston body, and an outer surface extending between said open end and said closed end of said piston body, said piston body defining a first axial length extending between said closed end and said open end; and a generally cylindrical unitary metal cover integrally molded in situ with said piston body, said cover including an open end defining an outboard end surface, a closed end defining an inner surface, and a side wall extending between said open end and said closed end of said cover, said cover defining a second axial length extending between said inner surface of said closed end and said outboard end surface of said open end of said cover which is greater than said first axial length defined between said closed end and said open end of said piston body;

wherein when said cover is molded in situ with said piston body, said closed end of said piston body is covered by at least a portion of said closed end of said cover, said outer surface of said piston body is covered by at least a portion of said side wall of said cover, at least a portion of said side wall of said cover extending axially past said open end of said piston body thereby locating said outboard end surface of said open end of said piston body radially inwardly relative to said outboard end surface of said open end of said cover.

12. The piston defined in claim 11 wherein said side wall of said cover includes a first side wall portion adjacent said closed end of said cover and a second side wall portion adjacent said open end of said cover, said first side wall portion extending a first axial length and defining a first cover outer diameter, said second side wall portion extending a second axial length and defining a second cover outer diameter which is less than said first cover outer diameter.

13. The piston defined in claim 12 wherein said first axial length of said first side wall portion of said cover is greater than said second axial length of said second side wall portion of said cover.

14. The piston defined in claim 11 wherein said closed end of said piston body is completely covered by said inner surface of said closed end of said cover.

15. The piston defined in claim 11 wherein said open end of said cover is castellated, having a plurality of equidistantly spaced projections which define a plurality of equidistantly spaced recesses therebetween.

16. The piston defined in claim 11 wherein said piston includes means for supporting said side wall of said cover adjacent said open end thereof.

17. The piston defined in claim 11 wherein said piston includes means for retaining said piston body inside said cover.

18. The piston defined in claim 11 wherein said side wall of said cover extends uninterrupted from said closed end to said open end thereof.

19. The piston defined in claim 11 wherein said cover defines a cover thickness, said piston body defines a piston body thickness which is greater than said cover thickness.

20. The piston defined in claim 11 wherein said outboard end surface of said open end of said piston body is not covered by said outboard end surface of said open end of said cover.

* * * * *

UNITED STATES PATENT AND TRADEMARK OFFICE
CERTIFICATE OF CORRECTION

PATENT NO. : 5,845,747
DATED : December 8, 1998
INVENTOR(S) : Russell E. Rike et al.

It is certified that error appears in the above-identified patent and that said Letters Patent is hereby corrected as shown below:

The title page should be deleted to appear as per attached title page.

Please delete drawing sheet 4 of 6 and substitute drawing sheet 4 of 6 as per attached.

Signed and Sealed this

Twenty-second Day of June, 1999

Attest:

Q. TODD DICKINSON

Attesting Officer

Acting Commissioner of Patents and Trademarks

United States Patent
Rike et al.

Patent Number: 5,845,747
Date of Patent: Dec. 8, 1998

[54] PISTON WITH EXTENDED OUTER COVER FOR USE IN DISC BRAKE ASSEMBLY

[75] Inventors: Russell E. Rike, Spring Valley; Brent A. Armentrout, Tipp City, both of Ohio

[73] Assignee: Dayton Walther Corporation, Dayton, Ohio

[21] Appl. No.: 834,586

[22] Filed: Apr. 7, 1997

Related U.S. Application Data

[63] Continuation of Ser. No. 510,806, Nov. 13, 1995, abandoned.

[51] Int. Cl.$^6$ .......................... F16D 55/18; F16D 65/78
[52] U.S. Cl. .......................... 188/72.4; 188/264 G
[58] Field of Search .......................... 188/264 G, 72.4, 188/264 R; 92/172, 192, 176, 208, 246

[56] References Cited

U.S. PATENT DOCUMENTS

| | | | |
|---|---|---|---|
| 2,801,714 | 8/1957 | Dotto | 188/264 |
| 4,170,926 | 10/1979 | Emmett | 92/212 |
| 4,306,489 | 12/1981 | Driver et al. | 92/212 |
| 4,401,012 | 8/1983 | Emmett | 92/248 |
| 4,449,447 | 5/1984 | Yanagi | 92/248 |
| 4,513,844 | 4/1985 | Hoffman, Jr. | 188/71.6 |
| 4,581,985 | 4/1986 | Villata | 92/248 |
| 4,649,806 | 3/1987 | Hartsock | 92/212 |
| 4,928,579 | 5/1990 | Emmett | 92/248 |
| 5,484,041 | 1/1996 | Cadaret et al. | 188/73.37 |

FOREIGN PATENT DOCUMENTS

| | | | |
|---|---|---|---|
| 1228963 | 11/1987 | Canada | |
| 2134-940 | 9/1978 | Germany | |
| 4328836-A1 | 3/1995 | Germany | |
| 57-18857 | 1/1982 | Japan | |
| 2028 | 1/1987 | Japan | 188/264 G |
| 1114446 | 5/1968 | United Kingdom | |
| 2122277 | 1/1984 | United Kingdom | 188/264 G |
| 2 165 902 A | 4/1986 | United Kingdom | |

OTHER PUBLICATIONS

Drawing No. DM-52-HW-4149, dated Dec. 13, 1989.
Drawing No. "Insert DM-52", dated Dec. 13, 1989.

*Primary Examiner*—Peter M. Poon
*Attorney, Agent, or Firm*—MacMillan, Sobanski & Todd

[57] ABSTRACT

A piston for use in a vehicle disc brake assembly includes a generally hollow cylindrical body having an open end and a closed end. The body is formed from a plastic material and includes inner and outer cylindrical surfaces which extend axially between the open end and the closed end. A generally cylindrical steel cover is integrally molded about the closed end and the outer surface of the body of the piston. The cover includes an end wall, an outer side wall and an open end. The end wall of the cover extends about the closed end of the body of the piston, and the outer side wall of the cover extends axially along the outer surface of the body of the piston. The outer side wall of the cover extends past the open end of the body of the piston, in the direction of the brake shoe. Accordingly, during the braking operation it is the steel cover which urges the brake shoe against the rotor, instead of the body of the piston urging the brake shoe against the rotor. The body of the piston does not come into contact with the brake shoe. This structure effectively protects the plastic body of the piston from the heat generated during braking, and thereby greatly extends the life of the piston.

20 Claims, 6 Drawing Sheets